Figure 1:
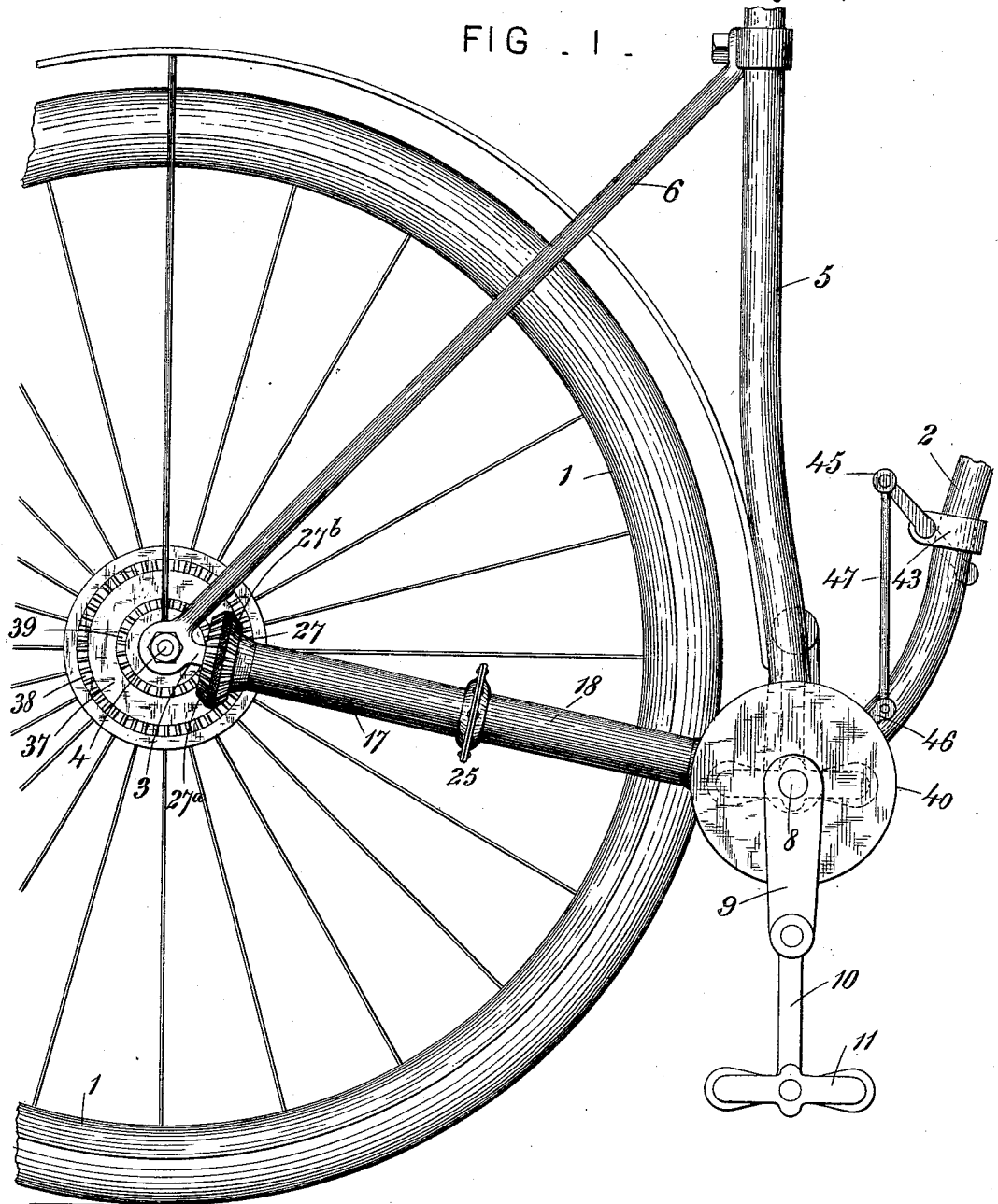

(No Model.) 5 Sheets—Sheet 2.

G. T. SMALLWOOD.
BICYCLE.

No. 479,470. Patented July 26, 1892.

Attest:
Otis Cole
Geo. S. Wheelock

Inventor
Geo. T. Smallwood (No Model.)

G. T. SMALLWOOD.
BICYCLE.

No. 479,470.

5 Sheets—Sheet 3.

Patented July 26, 1892.

Attest:
Otis Cole
Geo. L. Wheelock

Inventor
Geo. T. Smallwood (No Model.) 5 Sheets—Sheet 4.
G. T. SMALLWOOD.
BICYCLE.
No. 479,470. Patented July 26, 1892.
FIG. 7. FIG. 9. FIG. 6.
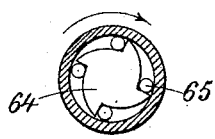
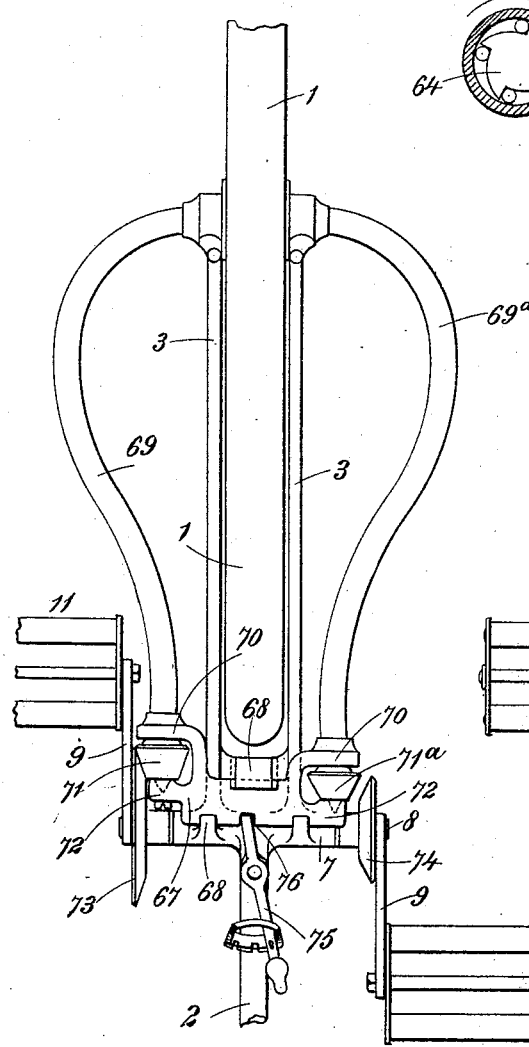
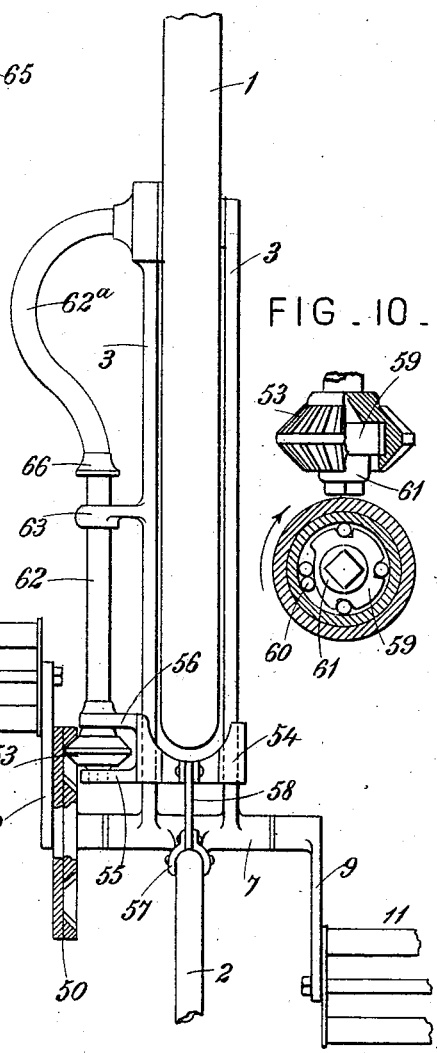
FIG. 10.
Attest: FIG. 8. Inventor:
Otis Cole Geo. T. Smallwood,
Geo. S. Wheelock
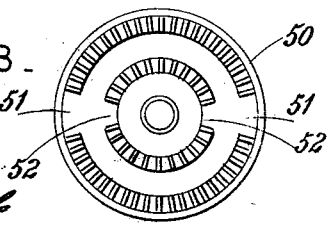

(No Model.) 5 Sheets—Sheet 5.
G. T. SMALLWOOD.
BICYCLE.
No. 479,470. Patented July 26, 1892.
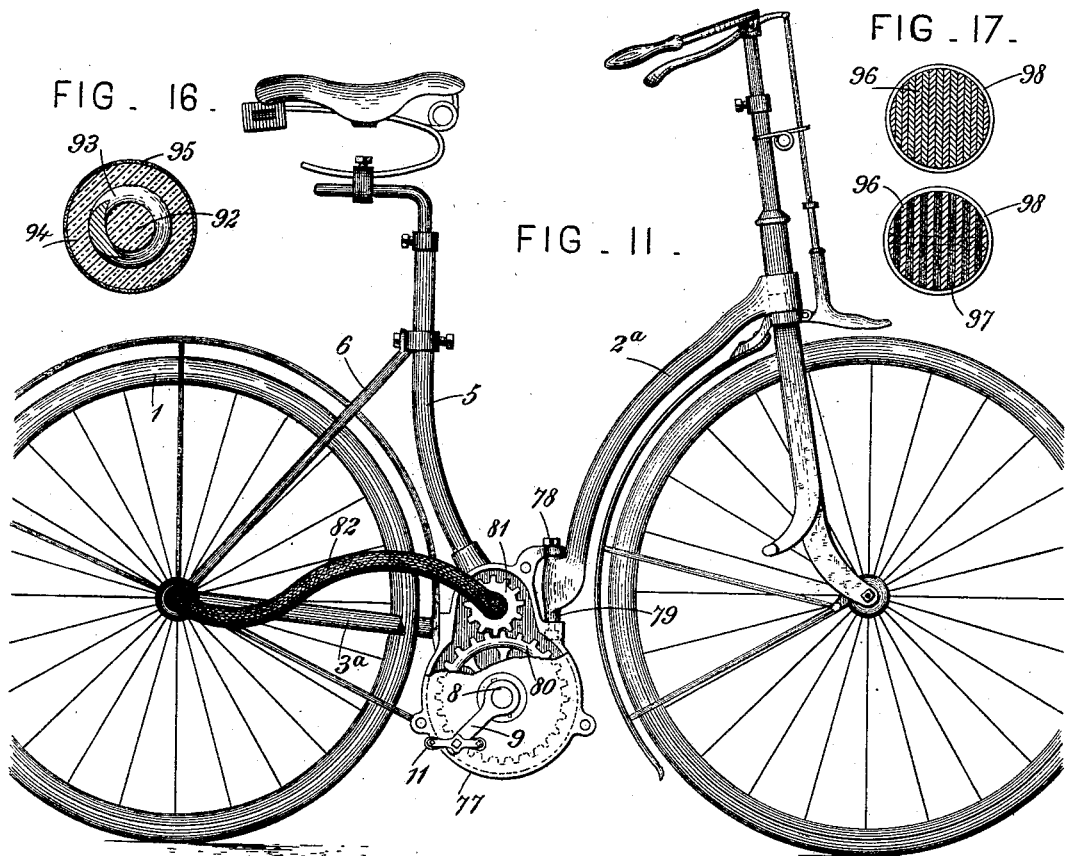
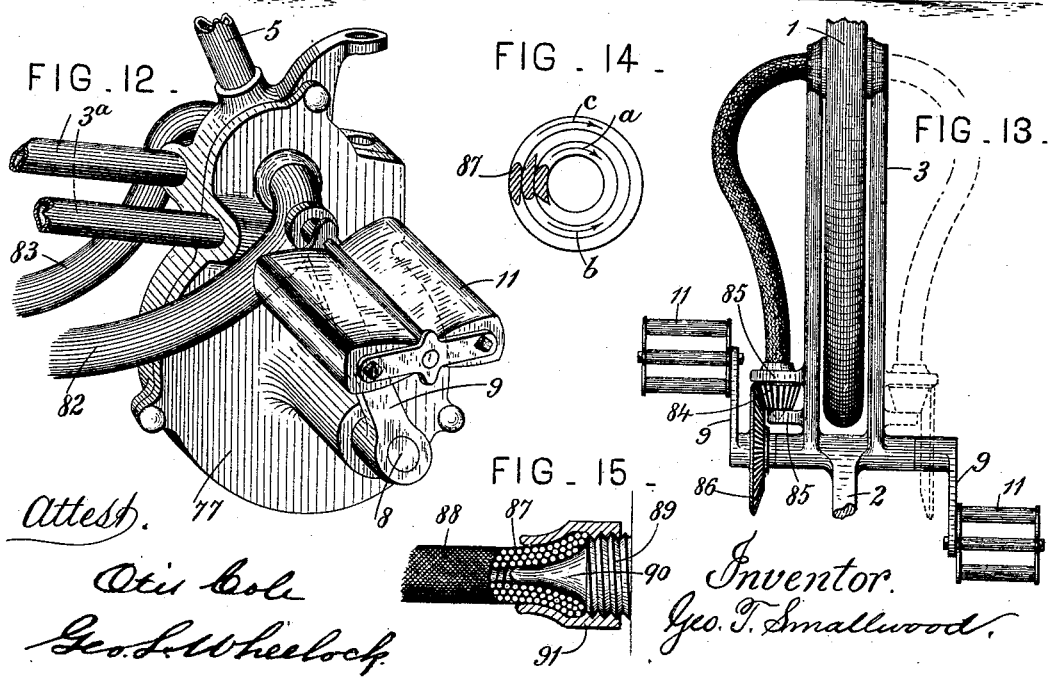
Attest.
Otis Cole
Geo. L. Wheelock
Inventor.
Geo. T. Smallwood.
THE NORRIS PETERS CO., PHOTO-LITHO., WASHINGTON, D. C.

UNITED STATES PATENT OFFICE.

GEORGE T. SMALLWOOD, OF WASHINGTON, DISTRICT OF COLUMBIA, ASSIGNOR OF ONE-HALF TO OTIS COLE, OF ROCHESTER, NEW YORK.

BICYCLE.

SPECIFICATION forming part of Letters Patent No. 479,470, dated July 26, 1892.

Application filed March 9, 1892. Serial No. 424,314. (No model.)

*To all whom it may concern:*

Be it known that I, GEORGE T. SMALLWOOD, a citizen of the United States, residing at Washington, in the District of Columbia, have invented certain new and useful Improvements in Bicycles; and I do declare the following to be a full, clear, and exact description of the invention, such as will enable others skilled in the art to which it appertains to make and use the same.

My invention relates to improvements in bicycles, and particularly to that class of bicycles wherein a geared shaft connecting the crank-shaft and driving-wheel is employed. Heretofore such shafts have been made individually rigid and provided with bevel-wheels at each end that mesh with ordinary bevel-wheels on the crank-shaft and driving-wheel axle, thus dispensing with the common endless chains. I have found in both cases—that is, where rigid shafts and endless chains are employed—the action on the drive-wheel is too hard and is not in the least degree elastic—that is to say, there is a rigid action throughout to the extent that in the case of the rigid shaft the bevel-wheels act together and as one wheel and in the case of the endless chain the sprocket-wheels turn simultaneously and not independently.

It is the object of my invention to obviate these defects and secure to the pedals and the parts intermediate thereof and the driving-wheel an elastic action, thereby relieving the rider of overexertion in propelling the machine and reducing the amount of muscular power exerted to a minimum.

Further objects of my invention are to obtain greater speed than heretofore and to permit of adjustment from power to speed, or vice versa, as desired.

To these ends my invention consists, broadly, in imparting motion to the driving-wheel through the medium of a flexible drive-shaft suitably connected with the crank-shaft, from which the machine is propelled.

My invention further consists in the provision of a shiftable connecting-shaft provided with means for shifting it to cause the machine to partake of either power or speed.

My invention further consists in a novel construction of pedal mechanism wherein the pedals are connected with the customary cranks by means of pivoted links.

My invention also consists in certain novel features of construction and combinations of parts to be hereinafter described, and then particularly pointed out in the claims.

The improvements are in the form of attachments, which can be applied to the frame-work of any Safety machine without changing the same but slightly. They can also be applied to velocipedes generally, such as bicycles, tricycles, tandems, and the like.

In order that my invention may be more fully understood, I will now proceed to describe the same with reference to the accompanying drawings, in which—

Figure 2:
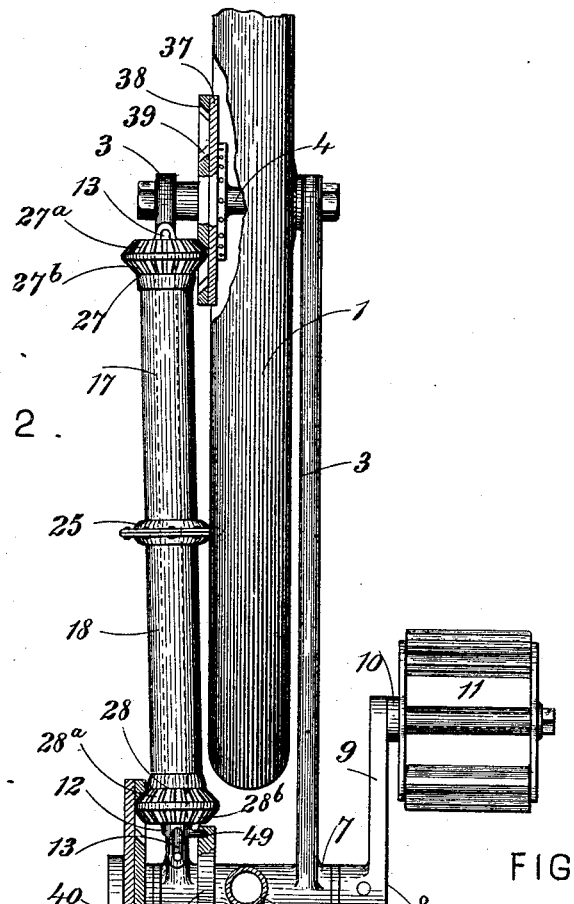
Figure 2A:
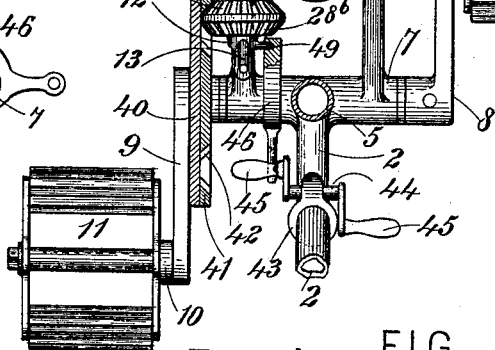
Figure 2B:
Figure 3:
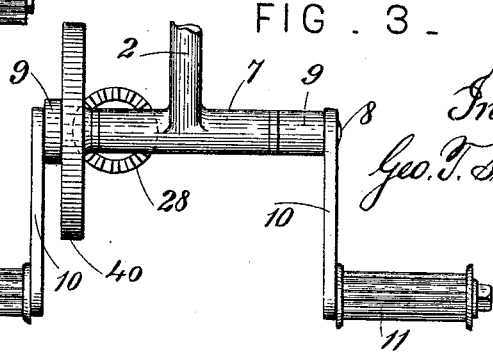
Figure 4:
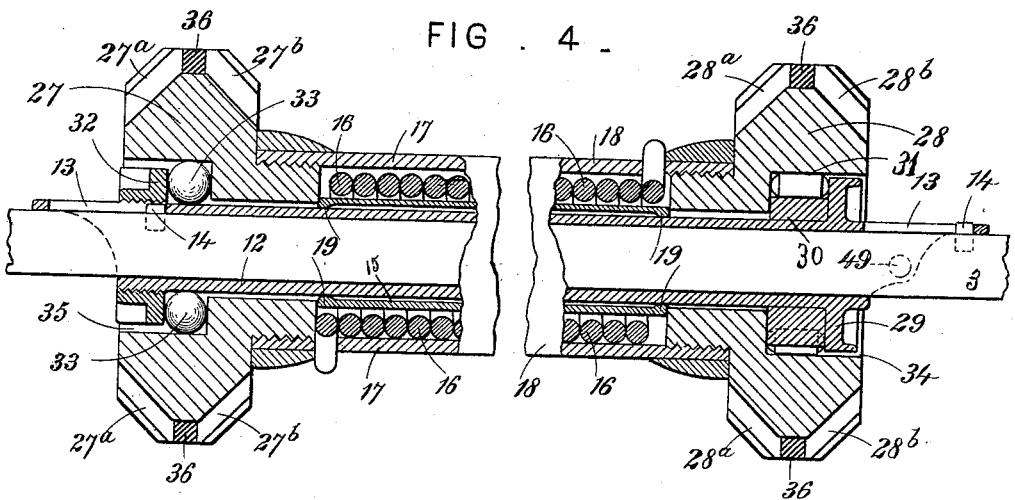
Figure 5:
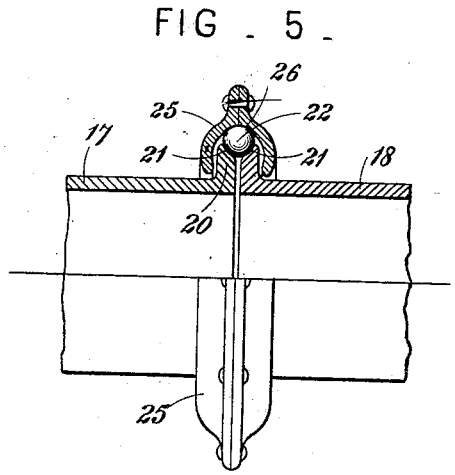

Figure 1 is a side elevation of a portion of a bicycle sufficient to illustrate my improvements as applied thereto. Fig. 2 is a plan view of the same. Fig. $2^a$ is a detail view of the rocking piece or cam. Fig. $2^b$ is a diagrammatic view showing the form of gear-teeth used. Fig. 3 is a detail front view of the crank-shaft. Fig. 4 is an enlarged detail in section of the preferred form of flexible shaft. Fig. 5 is an enlarged detail showing the part broken out in Fig. 4. Fig. 6 illustrates a modification in the means for obtaining power and speed. Fig. 7 illustrates a modification of the flexible shaft and the manner of applying the same. Fig. 8 is a face view of one form of driving-gear used in the construction shown in Fig. 6. Fig. 9 illustrates the preferred form of friction-clutch used in connecting the flexible shaft shown in Figs. 6 and 7 with the driving-wheel. Fig. 10 illustrates the form of bevel-wheel employed in the construction shown in Fig. 6. Fig. 11 illustrates another modification of my invention. Fig. 12 illustrates in perspective the casing shown in Fig. 11 for confining the gear-wheels. Fig. 13 illustrates another modification of my invention. Fig. 14 illustrates one form of flexible shaft in cross-section. Fig. 15 illustrates a manner of attaching the form of shaft shown in Fig. 14. Figs. 16 and 17 illustrate modified forms of flexible shafts.

Referring to the preferred form of my invention, (shown in Figs. 1 to 5, inclusive,) 1 indicates the rear or driving wheel of a Safety bicycle; 2, the backbone; 3, the forks thereof, in the rear ends of which the axle 4 is secured.

5 is the seat-standard, and 6 braces connecting the seat-standard and the rear ends of the backbone-forks 3.

Journaled in a cylindrical bearing 7 on the backbone 2 is the crank-shaft 8, having cranks 9 at each end.

The parts just described form no part of my invention, but only illustrate one form of bicycle to which my improvements may be applied.

To assist the rider in overcoming dead-centers, I pivot at the extremities of the cranks 9 links 10, which carry the pedals 11, of customary form. When the cranks 9 are in upright position, it will be observed that the power may be and is applied by the rider with a natural foot motion to one side of the dead-center by swinging the links 10 out of alignment with the cranks 9, and in this way moving the pedals forward beyond the dead-center.

Having described a portion of my invention, I will now describe the main feature thereof, this being a flexible or torsion drive-shaft. Said shaft is tubular in form and is mounted on one of the forks 3 of the backbone.

Mounted to slide on the fork 3 is a metallic tube or spindle 12, provided with longitudinal slots 13 at each end, through which project guide-pins 14 on the fork 3, which prevent rotary but permit longitudinal movement of the tube or spindle on the fork 3. What I term the "flexible shaft" is mounted to revolve upon this tube or spindle 12, both of which slide together on the fork 3, on which they are mounted.

The main parts which make up the flexible shaft are an inner tube 15, a spiral spring 16, and two outer tubular casings 17 and 18. The tube 15 has contact with the tube 12, upon which it turns, by means of beads or other suitable bearing-surfaces 19 at each end thereof.

Coiled around the inner tube 15 is the spring or wire 16, the extremities of which are respectively secured to the tubular casings 17 18, within which the spring is located, the space between the inner tube 15 and the casings 17 18 being preferably greater in width than the thickness of the wire of which the spring is made. This difference in the space and wire is made in order that the spring may have a space in which to expand and contract when necessary, its normal position being expanded against the inner sides of the tubular casings 17 and 18, although in practice the spring is made of such stout steel wire as will permit but little contraction, even though the machine be climbing a hill; but the value of the flexible shaft in this connection will be fully explained hereinafter.

The tubular casings 17 and 18 are adapted to turn relatively to each other, and to prevent their longitudinal separation, but permit of their so turning, their adjacent inner ends are provided with annular flanges 20, the edges of which are provided with matching annular grooves 21 for the reception of balls 22, which are confined by means of a sectional annular boxing fitted over the flanges 20 and consisting of two ring-sections 25, riveted together and provided on the inner sides with annular grooves 26 for said balls 22. Double-faced bevel-wheels 27 and 28, having bevel-teeth on each side, are suitably secured to the outer ends of the tubular casings 17 and 18, as by screwing them thereto, as shown. The respective bevel-teeth of bevel-wheel 27 are numbered $27^a$ and $27^b$, and the respective bevel-teeth of bevel-wheel 28 are numbered $28^a$ and $28^b$.

The construction of the bevel or gear teeth is only shown in Fig. $2^b$, as it cannot be well shown in any of the other figures. All the teeth run to a point at their extremities, as shown, so that when the parts are being geared up no shoulders or square obstructions will be presented to prevent the ready sliding together or engagement of the teeth.

The tube 12, on which the flexible shaft rotates, is provided at one end with a collar or flange 29, behind which is located a friction-clutch comprising a cam-toothed wheel 30 and rollers 31. The opposite end of the tube 12 is screw-threaded to receive a confining-nut 32, behind which is located the ball-bearing 33. The parts of the flexible shaft are assembled and then slipped over the tube or spindle 12, the cam-wheel 30 and collar 29 fitting in an annular recess 34 in the outer face of the bevel-wheel 28, in which recess the rollers 31 are confined. The balls 33 are then placed in the annular recess 35 in the outer face of the bevel-wheel 27 and the nut 32 screwed home on the tube 12, thus holding all the parts together. These parts may be shipped from the factory in this condition as an attachment for bicycles or a complete bicycle may be built at the factory with the attachment thereon. It will be noted that each bevel-wheel 27 28 has a ring 36 encircling it between its two separate sets of teeth, said ring being located in a groove between the teeth. This ring is of rubber or other equivalent noise-deadening material.

Applied to the driving-wheel 1 is a disk 37, provided with two series of bevel-teeth, being an outer series 38 and an inner series 39, concentric with and facing each other. The engaging faces of the bevel-wheel 27 extend between the teeth 38 and 39. Fixed on the crank-shaft 8 is another disk 40, constructed, like disk 37, with an outer series of bevel-teeth 41 and an inner series 42, and the engaging faces of the bevel-wheel 28 extend between said series of teeth 41 42. When the teeth $28^a$ of double bevel-wheel 28 are in engagement with the teeth 41 of disk 40 and the teeth $27^a$ of double bevel-wheel 27 are in engagement with the teeth 39 of disk 37, speed is gained, and when the teeth $28^b$ are in engagement with teeth 42 and the teeth $27^b$ are in engagement with the teeth 38 power is gained, so that the climbing of hills may more easily be accomplished. The shifting of the double bevel-wheels to power or speed is accomplished by sliding the flexible shaft and the tube or spindle 12 on their support. For this purpose I have devised the following shifting mechanism: 43 is a bearing projecting from the backbone 2, in which is journaled a short shaft 44, provided at each end on each side of the backbone with foot-cranks 45 within convenient reach of the feet of the rider. 46 is a rocking piece (see Fig. 2$^a$) journaled on the sleeve 7 and operated at one end through the medium of a rod 47, connected with the same and with one of the foot-cranks 45, and provided at the other end with a cam-groove 48, which receives the projecting end of a lug 49 on the inner end of the tube 12. It will be seen that by operating the rocking piece 46 by means of the foot-cranks the flexible shaft and double bevel-wheels can be shifted to the desired point of operation, or the said parts may be thrown entirely out of gear with the toothed disks.

The operation of the flexible shaft is as follows: The machine, as shown in Figs. 1 and 2, is geared for speed and running on level ground. Gear 41 drives bevel-wheel 28, which through the medium of spring 16 drives bevel-wheel 27, which imparts rotation to the driving-wheel 1 through its gear 39. The rider reaches the base of a hill, and, placing his foot on crank 45, rotates rocking piece 46 and causes its slot 48 to act upon pin 49. This shifts bevel-wheel 28 into engagement with gear 42 and bevel-wheel 27 into engagement with gear 38. It will now be seen that the distance between the crank-shaft 8 and bevel-wheel 28 has been lessened, and the leverage is correspondingly increased. The distance between bevel-wheel 27 and axle 4 has been increased, and consequently the bevel-wheel 27 is given a greater leverage power to drive wheel 1. Thus the speed of the machine is sacrificed for the power required to climb the hill. Upon reaching the top the rider desires to descend upon the opposite side. Bevel-wheels 27 28 are moved to the space between the gears 37 38 41 42, out of engagement entirely, and the rider coasts down-hill, wheel 1 imparting no action to the flexible shaft. Upon reaching the base of the hill the rider is at liberty to shift the flexible shaft for power or speed, as desired. The friction-clutch 30 31, such as shown in Fig. 9, will act to prevent retrograde rotation of the flexible shaft, but will permit free forward rotation thereof, the double bevel-pinions 28 27 having bearing on the rollers 31 and on balls 33.

In the modification of my invention illustrated by Figs. 6, 8, 9, and 10 I have shown no links 10, as in the main form. As before stated, the links were to assist in overcoming dead-centers. In the present modification the crank-shaft carries a disk 50, similar to disk 40, in the form of a mutilated gear-wheel, provided with diametrically-opposite blank or toothless spaces 51 52 for the outer and inner series of bevel-teeth, respectively, of said disk 50. Adapted to mesh with the teeth of disk 50 is a double-faced bevel-wheel 53, similar to the wheels 27 and 28. When the blank spaces 51 52 are opposite the bevel-wheel 53, the pedals slip past the dead-centers, and thus no more extra force is exerted than is required. The forks 3 of the backbone have mounted thereon a slide 54, provided with perforated ears 55 56, between which the bevel-wheel 53 is located. This slide 54 is moved back and forth to cause the teeth of bevel-wheel 53 to engage with either the inner or outer series of teeth of disk 50 by means of a yoke 57, pivoted on the backbone 2, and a link 58, pivotally connected with the yoke and the slide. Contained within the bevel-wheel 53 is a friction-clutch consisting of a cam-piece 59 and rollers 60, said cam-piece being fixed on a short stud or gudgeon 61, which is fixed in the perforation of ear 55 and projects into said bevel-wheel. This friction-clutch prevents retrograde movement of the bevel-wheel 53. The bevel-wheel 53 is rigidly secured at one end of a shaft 62, which passes through and has suitable bearing in the perforation of ear 56. This shaft also passes through and has bearing in a perforated lug 63 on one of the forks 3, and its outer end is connected through the medium of a flexible shaft connection 62$^a$ with a cam-toothed wheel 64 of a friction-clutch provided with rollers 65, which friction-clutch is confined within the hub of the driving-wheel 1. Shafts 62 and 62$^a$ are connected by a suitable coupling 66.

The flexible shaft 62$^a$, as well as those shown in the remaining modifications, may be constructed in either of the several ways to be hereinafter described.

Although I have shown friction-clutches in the forms of my machine already described, I do not consider them absolutely essential, but prefer them, as they cause the flexible shaft and driving-wheel to turn together and permit an independent movement of the driving-wheel.

In the modification of my invention illustrated by Fig. 7 I dispense with the double bevel-wheels and use only ordinary bevel-wheels, except in so far as the teeth each run to a point at the extremity. 67 is a transversely-shiftable slide held to the machine and guided by overlapping lugs 68, projecting from the framework. 69 69$^a$ are flexible shafts of suitable construction, one being on each side of the machine, which shafts at their inner ends are applied to the driving-wheel 1. The connection between the flexible shafts and the driving-wheel is by means of friction-clutches on each side, such as shown in Fig. 9, the purpose being to disconnect one shaft when the other shaft is driving. The inner ends of the flexible shafts 69 69$^a$ pass through and have bearing in lugs 70 on the slide 67 and carry the simple bevel-wheels 71 71$^a$, each of which has cone-bearing in the lugs 72, also on the slide. At the outer ends of the crank-shaft 8 are bevel-wheels 73 and 74, respectively. Bevel-wheel 73, which is the larger, is engaged by the bevel-wheel 71, and bevel-wheel 74, which is the smaller, is engaged by the bevel-wheel 71ª. When wheel 73 is in gear, speed is obtained, and when wheel 74 is in gear power is obtained. The slide 67, being shifted to either side by means of a pivoted lever 75, engaging in a notch 76 in the slide, causes the desired bevel-wheels 71 71ª to engage with the respective bevel-wheels 73 74.

In the modification illustrated in Figs. 11 and 12 the gearing is inclosed within a sectional box or casing 77, provided with means for supporting a pivot-bolt 78, which receives a sleeve 79 on the backbone 2ª, whereby the machine is divided into front and rear parts pivotally connected. The forks 3ª project from the casing 77, being suitably attached thereto. The crank-shaft 8 extends through the casing 77 and is provided with a large gear-wheel 80, which meshes with a smaller gear-wheel 81, journaled in the casing. Flexible shafts 82 83 on each side of the machine are connected with the driving-wheel 1 and pass through the sides of the casing 77 and are secured to the gear-wheel 81. Said shafts 82 83 move in unison to drive the wheel 1 when the crank-shaft is operated.

Fig. 13 illustrates a modification wherein a single flexible shaft is shown provided with a single bevel-wheel 84 at its inner end, bearings at that end being provided by means of lugs 85, projecting from one of the forks 3. The bevel-wheel 84 meshes with a larger bevel-wheel 86 on the crank-shaft, whereby the flexible shaft may be revolved. Similar attachments may be provided on the opposite side of the machine, as indicated in dotted lines.

Some of the various forms of flexible shafts that may be employed in lieu of the main form shown and described are constructed as follows:

Figs. 14 and 15 show three layers of steel wire 87, wound spirally one around the other and provided with a water-proof covering or casing 88. These spirally-wound layers are preferably made up of one piece of wire, the coils being wound close together in each layer, but in opposite directions, (see Fig. 14)—that is to say, the inner layer has its coils wound in one direction (see arrow a) from one end of the shaft to the other, the next layer has its coils wound in the reverse direction, (see arrow b,) and the outer layer has its coils wound in the same direction as the inner coil. (See arrow c.) Of course the number of the spiral layers may be varied as found best. As a means of attaching the flexible shaft at either end I have shown a screw-threaded stud 89, provided with a conical projection 90, which is inserted into one end of the shaft, and a lock-nut 91, which is placed over the end of the shaft and screwed onto the stud 89, thus tightly gripping the end of the shaft between the conical projection 90 and the nut 91.

In Fig. 16 another form of flexible shaft is shown, and it consists of a rubber core 92, a spirally-wound wire 93 around the core, a rubber tube 94, inclosing said parts, and a covering of water-proof material 95.

In Fig. 17 still other forms of flexible shafts are shown, being composed either of layers of metallic strips 96 or of alternate layers of metallic strips 96 and rubber strips 97, inclosed within water-proof casings 98.

Some of the reference-numbers used in describing the main form are used in the modifications to indicate similar parts.

It is of course evident that various structural changes can be made in my invention without departing from the scope thereof. For instance, the bevel-gearing shown in the preferred form of my machine may be adapted to a rigid shaft as well as my flexible shaft.

Having thus described my invention, what I claim is—

1. A bicycle provided with a crank-shaft, a driving-wheel, and a flexible shaft connecting the crank-shaft and driving-wheel, said crank-shaft being located outside the wheel, substantially as set forth.

2. A bicycle provided with a crank-shaft, a driving-wheel, and a flexible drive-shaft extending alongside the driving-wheel and connecting the same with the crank-shaft, substantially as set forth.

3. In a bicycle, the driving-wheel, a shiftable drive-shaft, and power and speed devices adapted to the shiftable drive-shaft, substantially as set forth.

4. In a bicycle, the driving-wheel, a longitudinally-shiftable drive-shaft, and power and speed devices adapted to the drive-shaft, substantially as set forth.

5. In a bicycle, the driving-wheel, a flexible drive-shaft, and power and speed devices adapted to the drive-shaft, substantially as set forth.

6. In a bicycle, the driving-wheel, a shiftable flexible drive-shaft, and power and speed devices adapted to the drive-shaft, substantially as set forth.

7. In a bicycle, the driving-wheel and a torsion drive-shaft adapted to drive the wheel, substantially as set forth.

8. In a bicycle, the driving-wheel, the crank-shaft provided with links, the pedals carried by the links for turning the crank-shaft and to assist in overcoming dead-centers, and a power-storing device operated by the crank-shaft, substantially as set forth.

9. In a bicycle, the combination, with the driving-wheel, the crank-shaft, and a disk having a double series of teeth, of a drive-shaft having a double-faced wheel adapted to engage either of said series of teeth and having connection with the driving-wheel, substantially as set forth.

10. In a bicycle, the herein-described relatively-adjustable gearing provided with intermeshing teeth running to points at their extremities, substantially as set forth.

11. In a bicycle, the combination, with the driving-wheel, the crank-shaft, and two disks respectively on the driving-wheel and crank-shaft, said disks being each provided with a double series of teeth, of a shiftable drive-shaft having a double-faced wheel at each end, adapted to engage with the teeth on said disks, substantially as set forth.

12. In a bicycle, the combination, with the driving-wheel and the crank-shaft, of a drive-shaft adapted to connect the driving-wheel and the crank-shaft, said drive-shaft comprising relatively-movable casings and a torsion-spring located within and connected with the casings, substantially as set forth.

13. In a bicycle, the combination, with the driving-wheel and the crank-shaft, of a drive-shaft adapted to connect the driving-wheel and the crank-shaft, said drive-shaft comprising relatively-movable casings, a boxing connecting the casings, ball-bearings within the boxing, and a torsion-spring located within and connected with the casings, substantially as set forth.

14. In a bicycle, the combination, with the driving-wheel, the crank-shaft, and power and speed devices, of a shiftable drive-shaft to which said power and speed devices are adapted, said drive-shaft comprising relatively-movable casings and a torsion-spring located within and connected with the casings, substantially as set forth.

15. In a bicycle, the herein-described gearing, the same comprising a wheel having two series of teeth separated by a peripheral groove and a noise-deadening ring confined in said groove, substantially as set forth.

16. An attachment for bicycles, tricycles, and the like, the same comprising relatively-movable casings provided with gear-wheels and a spring confined within and acting upon the casings, substantially as set forth.

17. An attachment for bicycles, tricycles, and the like, the same comprising relatively-movable casings provided with gear-wheels, a boxing in which the meeting ends of the casings bear, and a spring confined within and acting upon the casings, substantially as set forth.

18. An attachment for bicycles, tricycles, and the like, the same comprising relatively-movable casings provided with gear-wheels and a torsion-spring acting upon the casings, substantially as set forth.

19. An attachment for bicycles, tricycles, and the like, the same comprising relatively-movable casings provided with gear-wheels and a spiral spring acting upon the casings, substantially as set forth.

20. An attachment for bicycles, tricycles, and the like, the same comprising relatively-movable casings provided with gear-wheels, a confined inner tube or spindle, and a spiral spring inclosing the tube or spindle and inclosed in and acting upon the casings, substantially as set forth.

21. An attachment for bicycles, tricycles, and the like, the same comprising a hollow flexible shaft provided with gear-wheels and a tube or spindle extending therethrough and on which the flexible shaft turns, substantially as set forth.

22. An attachment for bicycles, tricycles, and the like, the same comprising relatively-movable casings provided with gear-wheels, a spiral spring within and acting upon the casings, and a tube or spindle extending through the spring and casings and on which the spring and casings turn, substantially as set forth.

23. An attachment for bicycles, tricycles, and the like, the same comprising a hollow flexible shaft provided with gear-wheels, a tube or spindle extending therethrough, and a friction-clutch on the tube, substantially as set forth.

24. An attachment for bicycles, tricycles, and the like, the same comprising a hollow flexible shaft provided with gear-wheels, a tube or spindle extending therethrough, and anti-friction bearings on which the gear-wheels turn, substantially as set forth.

25. In a bicycle, the combination of the driving-wheel and a flexible or torsion drive-shaft with the crank-shaft, links pivoted to the cranks of the latter, and the pedals carried by the links, substantially as and for the purpose set forth.

26. In a bicycle, the driving-wheel, power-storing mechanism operated by the pedals, and a clutch for preventing reaction of the power-storing mechanism, substantially as set forth.

In testimony whereof I affix my signature in presence of two witnesses.

GEO. T. SMALLWOOD.

Witnesses:
PHILIP MAURO,
GEO. L. WHEELOCK.